United States Patent
Fest

(10) Patent No.: US 9,741,163 B2
(45) Date of Patent: Aug. 22, 2017

(54) 3-D POLARIMETRIC IMAGING USING A MICROFACET SCATTERING MODEL TO COMPENSATE FOR STRUCTURED SCENE REFLECTIONS

(71) Applicant: Raytheon Company, Waltham, MA (US)

(72) Inventor: Eric C. Fest, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 63 days.

(21) Appl. No.: 14/978,265

(22) Filed: Dec. 22, 2015

(65) Prior Publication Data

US 2017/0178399 A1 Jun. 22, 2017

(51) Int. Cl.
| G06T 17/00 | (2006.01) |
| G06T 7/60 | (2017.01) |
| G06T 15/20 | (2011.01) |
| G06T 15/50 | (2011.01) |
| G06T 7/00 | (2017.01) |

(52) U.S. Cl.
CPC ............. *G06T 17/00* (2013.01); *G06T 7/004* (2013.01); *G06T 7/60* (2013.01); *G06T 15/20* (2013.01); *G06T 15/50* (2013.01); *G06T 2200/04* (2013.01)

(58) Field of Classification Search
USPC .................................. 382/154, 275; 356/491
See application file for complete search history.

(56) References Cited

U.S. PATENT DOCUMENTS

| 5,028,138 | A | 7/1991 | Wolff | |
| 6,674,532 | B2 * | 1/2004 | VanDelden | G01J 4/04 356/491 |
| 7,630,077 | B2 * | 12/2009 | Schultz | G01J 4/04 356/364 |
| 7,737,975 | B2 | 6/2010 | Sato et al. | |
| 7,859,661 | B2 * | 12/2010 | Ossikovski | G01J 3/02 356/301 |
| 7,948,514 | B2 | 5/2011 | Sato et al. | |
| 8,025,408 | B2 | 9/2011 | Sato et al. | |
| 8,149,268 | B1 * | 4/2012 | Meyers | H04N 5/144 348/42 |

(Continued)

OTHER PUBLICATIONS

Atkinson, Surface shape and Reflection Analysis Uing Polarization, The University of York, Department of Computer Science, May 2007.*

(Continued)

*Primary Examiner* — Ishrat I Sherali
(74) *Attorney, Agent, or Firm* — Eric A. Gifford

(57) ABSTRACT

A system and method for more accurately generating the surface normal calibration maps φ(AoLP) and θ(DoLP,φ) to compensate for structured scene reflections for 3-D polarimetric imaging. This is accomplished using a microfacet scattering model to develop the functional form of a polarized bidirectional reflectance distribution function (BRDF) of the object surface. The ambient radiance is ray traced to the BRDF to create the calibration maps φ(AoLP) and θ(DoLP,φ), which may be combined into a single calibration map θ(DoLP, AoLP). These maps are applied to the AoLP and DoLP images to compute an array of surface normals, which are then mapped to form a 3-D image of the object.

18 Claims, 8 Drawing Sheets

(56) References Cited

U.S. PATENT DOCUMENTS

| | | | | |
|---|---|---|---|---|
| 8,184,194 | B2* | 5/2012 | Sato | G02B 27/283 |
| | | | | 348/335 |
| 8,217,368 | B2* | 7/2012 | Meyers | G01N 21/21 |
| | | | | 250/459.1 |
| 8,532,958 | B2* | 9/2013 | Ingram | G01S 7/411 |
| | | | | 252/582 |
| 8,736,670 | B2 | 5/2014 | Barbour et al. | |
| 8,913,243 | B2* | 12/2014 | Silny | G01J 4/00 |
| | | | | 356/364 |
| 9,423,484 | B2* | 8/2016 | Aycock | G01S 3/7861 |
| 2003/0174328 | A1* | 9/2003 | Russell | G01J 4/00 |
| | | | | 356/366 |
| 2010/0032557 | A1* | 2/2010 | Schiller | G01J 1/02 |
| | | | | 250/252.1 |
| 2014/0286566 | A1* | 9/2014 | Rhoads | H04N 13/0275 |
| | | | | 382/154 |
| 2016/0307053 | A1* | 10/2016 | Aycock | G06K 9/00255 |

OTHER PUBLICATIONS

Robert T. Frankot, "A Method for Enforcing Integrability in Shape from Shading Algorithms," IEEE Transactions on Pattern Analysis and Machine Intelligence, vol. 10, No. 4, Jul. 1988, pp. 439-451.

Miyazaki et al., "Determining surface orientations of transparent objects based on polarization degrees in visible and infrared wavelengths," vol. 19, No. 4/ Apr. 2002/J. Opt. Soc. Am. A, pp. 687-694.

Priest et al.,"Polarimetric microfacet scattering theory with applications to absorptive and reflective surfaces," Opt. Eng. 41(5) 988-993 (May 2002), 2002 Society of Photo-Optical Instrumentation Engineers, pp. 988-993.

James R. Shell II, "Polarimetric Remote Sensing in the Visible to Near Infrared," A dissertation submitted in partial fulfillment of the requirements for the degree of Doctor of Philosophy in the Chester F. Carlson Center for Imaging Science Rochester Institute of Technology 2005.

Thomas A. Germer, "Polarized light diffusely scattered under smooth and rough interfaces," Proceedings of SPIE vol. 5158 Polarization Science and Remote Sensing, edited by Joseph A. Shaw, J. Scott Tyo (SPIE, Bellingham, WA, 2003), pp. 193-204.

* cited by examiner

3-D POLARIMETRIC IMAGING USING A MICROFACET SCATTERING MODEL TO COMPENSATE FOR STRUCTURED SCENE REFLECTIONS

BACKGROUND OF THE INVENTION

Field of the Invention

This invention relates to 3-D polarimetric imaging, and more particular to a method of generating the surface normal calibration maps φ(AoLP) and θ(DoLP,φ) to compensate for structured scene reflections.

Description of the Related Art

Imaging detectors, such as focal plane arrays (FPAs), generally include an array of pixels, each pixel including a photo-detector that generates a signal responsive to light generated or reflected by an object. These signals are collected and combined such that a 2-D digital image of the object can be created. Pixelated filter arrays positioned in a fixed location over the detector array are widely used in commercial imaging systems to provide hyperspectral capability. For example, digital cameras use fixed-in-place pixelated filter arrays for color (RGB) photography. These filters reduce the amount of light that reaches the imaging pixel (for example, a red filter reflects blue and green light). For example a 2×2 filter sub-array of R/G/G/B maps to a 2×2 grouping of detector pixels that form a single image pixel.

A polarimetric digital camera may use a Linear Stokes Polarimeter to analyze the polarization components of light to, for example, extract shape information from an object. Polarimetry requires at least three measurements to analyze the polarization components of light; at least two different polarization components and possibly an unpolarized component. The Linear Stokes Polarimeter may output directly or electronics may compute an Angle of Linear Polarization (AoLP) image and a Degree of Linear Polarization (DoLP) image from the measurements to extract 2-D shape information.

One embodiment of a Linear Stokes Polarimeter is a rotating linear polarizer that time multiplexes the at least three measurements taken at different times, hence different angular values. Another embodiment is a pixelated filter array in which the filter sub-arrays have different linear polarizations. Typically, the pixelated filter array, and detector, are divided into groups of four pixels (e.g., a 2×2 sub-array of pixels) that form a single image pixel. The standard commercially available polarized pixelated filter sub-array is a 2×2 array of linear polarizers having angular values of $\Theta_1=0°$, $\Theta_2=45°$, $\Theta_3=90°$ and $\Theta_4=135°$, respectively, which are optimum assuming perfect alignment between the pixelated filter array and the FPA. U.S. Patent Publication 2014/0063299 to Fest et. al. entitled "Movable Pixelated Filter Array" describes a technique for using the data reduction matrix to account for misalignment.

The AoLP and DoLP images can be processed to extract 3-D shape information and form a 3-D image of the object. Surface normal calibration maps φ(AoLP) and θ(DoLP,φ) map the values of the respective images to the azimuth angle φ and elevation angle θ that together define the surface normal at a given location on the object. These maps are computed based on idealized plots 10 and 12 of specular s-polarized and p-polarized reflectance, respectively, versus angle of incidence for a given surface (e.g. smooth aluminum at 3 microns) as shown in FIG. 1. A DoLP 14 is computed as (S−P/S+P). The maps are used to compute the surface normal at points on the target. A shape shading algorithm such as the Frankot-Chellapa algorithm (see Robert T. Frankot and Rama Chellappa, "A Method for Enforcing Integrability in Shape from Shading Algorithms" IEEE Trans. on Pattern Analysis and machine Intelligence, Vol. 40, No. 4, July 1988), which is hereby incorporated by reference, processes the surface normal to compute a depth at each pixel, which together with the surface normal forms the 3-D image of the object.

Sensors operating in the VIS, NIR, or SWIR wavebands can only see room temperature targets if the targets are illuminated by external sources (such as the sun or a light) and the reflected light hits the sensor. For this reason, these bands are often called "reflective bands". The Fresnel equations predict that this reflected light is s-polarized; that is, the orientation of linear polarization of the light reflected from the target is perpendicular to the plane containing the surface normal and the Line of Sight (LOS) vector (aka the scatter plane). The degree of s-polarization is determined by surface properties of the object such as the orientation of the surface, its complex refractive index, and its roughness. Sensors operating in the MWIR and LWIR see a combination of light emitted from the room-temperature target and light that is reflected from the target by sources around it. These bands are called "emissive bands", and light emitted from a target is p-polarized (orientation of polarization is parallel to the scatter plane). Light reflected from the target is polarized perpendicular to the emitted light, and therefore will cancel out some (or all) of the polarization. The degree of p-polarization is determined by the surface properties of the object.

Daisuke Miyazaki et. al., "Determining surface orientations of transparent objects based on polarization degrees in visible and infrared wavelengths" Vol. 19, No. 4, April 2002, J. Opt. Soc. Am. A discloses a method for obtaining surface orientations of transparent surfaces through analysis of the degree of polarization in surface reflection and emission in visible and far-infrared wavelengths, respectively. The degree of polarization at visible wavelengths provides two possible surface orientations. The polarization degree in the infrared wavelengths is used to disambiguate the results and select the single surface orientation. Miyazaki employs a spherical diffuser illuminated from point light sources as the external source for the visible light measurements to illuminate an object located at the center of the diffuser from all directions. Miyazaki heats the object to 30-40° and assumes that the infrared light is dominated by emissions, an additional light source is not used. Miyazaki constructs his measurements in such a way to avoid structured scene reflections from multiple external sources such that the different calibration maps for the visible and IR bands can be derived from FIG. 1.

Another class of 3-D polarimetric imaging techniques attempts to compensate for structured scene reflections from multiple external sources in the band of interest. If uncompensated, the structured scene reflections can introduce a bias in the calibration maps that corrupts the 3-D image. Given a radiance map (location, size and brightness of light sources) of a known environment, these techniques assume that the measured reflectance from each object pixel is a combination of a specular component and a diffuse component. The specular component is s-polarized. The techniques identify the pixels that are strongly s-polarized (specular) and use mappings derived from FIG. 1 to identify the elevation angle. Only pixels that are strongly s-polarized are processed. Therefore, a given source will only produce the calibration map over a narrow angular range. This approach requires multiple sources at different locations to adequately populate the calibration maps. Furthermore, the accuracy of the calibration maps is limited by the assumption that each object pixel is a combination of a specular component and a diffuse component. U.S. Pat. Nos. 5,028,138; 7,737,975 and 7,948,514 disclose variants of this based on the same specular/diffuse assumption.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for more accurately generating the surface normal calibration maps $\phi(AoLP)$ and $\theta(DoLP,\phi)$ to compensate for structured scene reflections. The method does not assume a single idealized reflective source or a single dominant emissive source. The method does not assume that each object pixel is a combination of specular and diffuse components and does not require a large number of external sources at different locations to adequately populate the calibration maps.

This is accomplished using a microfacet scattering model to develop the functional form of a polarized bidirectional reflectance distribution function (BRDF) of the object surface. The ambient radiance, known or measured, is ray traced to the BRDF to create the calibration maps $\phi(AoLP)$ and $\theta(DoLP,\phi)$, which may be combined into a single calibration map $\theta(DoLP, AoLP)$.

In an embodiment, a far-field radiance map $L(\theta,\phi)$ is provided in a spectral band of a scene from the perspective of the object where $\theta$ and $\phi$ are the elevation angle and azimuth angle components of a surface normal of the object. A microfacet scattering model is used to provide a polarized BRDF of a surface of the object. The far-field radiance map $L(\theta,\phi)$, polarized BRDF and a line-of-sight vector from a sensor to the object are used by a computer processor to compute surface normal calibration maps $\phi(AoLP)$ and $\theta(DoLP,\phi)$.

In different embodiments, computing the surface normal calibration maps comprises for each of a plurality of $\theta_i$ and $\phi_i$ that span a specified volume of the scene, and for all points in the radiance map, tracing an unpolarized ray, represented by a Stokes vector Sin of the ray, to the surface of the object, using the polarized BRDF to compute a Mueller matrix M for the unpolarized ray, multiplying the Stokes vector Sin by the Mueller Matrix M to provide a Stokes vector S to the sensor having components S0, S1 and S2, adding all of the Stokes vectors S for all points in the radiance map for each elevation and azimuth angle pair and computing an AoLP $(\phi)=0.5*\mathrm{atan}(S2/S1)$ and $\mathrm{DoLP}(\theta,\phi)=\mathrm{sqrt}(S1^2+S2^2)/2$. $\mathrm{AoLP}(\phi)$ and $\mathrm{DoLP}(\theta,\phi)$ are inverted to compute $\phi(AoLP)$ and $\theta(DoLP,\phi)$.

In different embodiments in the VIS to SWIR reflective bands, the Stokes vector includes only contributions from reflective sources.

In different embodiments in the MWIR to LWIR emissive bands, the Stokes vector includes an emissive contribution from the object and reflective contributions from other reflective sources.

In different embodiments, multiple different spectral bands with different calibration maps are used to construct the 3-D image of the object.

In an embodiment, a linear Stokes Polarimeter (e.g., polarizer, sensor and electronics) filters incident radiation as a function of polarization, senses the radiation and outputs AoLP and DoLP images of the object. The polarizer may, for example, be a rotating linear polarizer or a pixelated filter array. The pixelated filter sub-arrays may have linear polarization values optimized for perfect alignment with the sensor or for a probabilistic misalignment. A processor(s) applies the surface normal calibration maps $\phi(AoLP)$ and $\theta(DoLP,\phi)$ to the AoLP and DoLP images to compute an array of surface normals for the object and maps (e.g., the Frankot-Chellapa algorithm) the array of surface normals to form a 3-D image of the object.

These and other features and advantages of the invention will be apparent to those skilled in the art from the following detailed description of preferred embodiments, taken together with the accompanying drawings, in which:

DETAILED DESCRIPTION OF THE INVENTION

Known techniques for 3-D polarimetric imaging are neither sufficiently robust nor accurate to have achieved commercial viability. These techniques are either predicated upon an assumption of lighting conditions that is not realistic (e.g., no structured scene reflections) or upon an assumption of the measured reflectance due to structured scene reflections (e.g., a combination of specular and diffuse reflection) that is often inaccurate and produces sparsely populated calibration maps.

The present technique for 3-D polarimetric imaging, and more particularly for generating the surface normal calibration maps $\phi(AoLP)$ and $\theta(DoLP,\phi)$, makes neither assumption. This approach uses Stokes vectors to describe the polarization state of the structured scene reflections and Mueller calculus to describe the effect of the object surface on the polarization state of the light. A microfacet scattering model is used to develop the functional form of a polarized bidirectional reflectance distribution function (BRDF) (e.g., the Mueller matrix) for the object surface. The ambient radiance is ray traced to the BRDF to create the calibration maps $\phi(AoLP)$ and $\theta(DoLP,\phi)$, which may be combined into a single calibration map θ(DoLP, AoLP). This technique can be applied over the entire surface of the object, hence produces densely populated calibration maps that more accurately compensate for the structured scene reflections. These maps are applied to the AoLP and DoLP images generated by a linear Stokes polarimeter to compute an array of surface normals, which are then mapped to form a 3-D image of the object.

Figure 1:
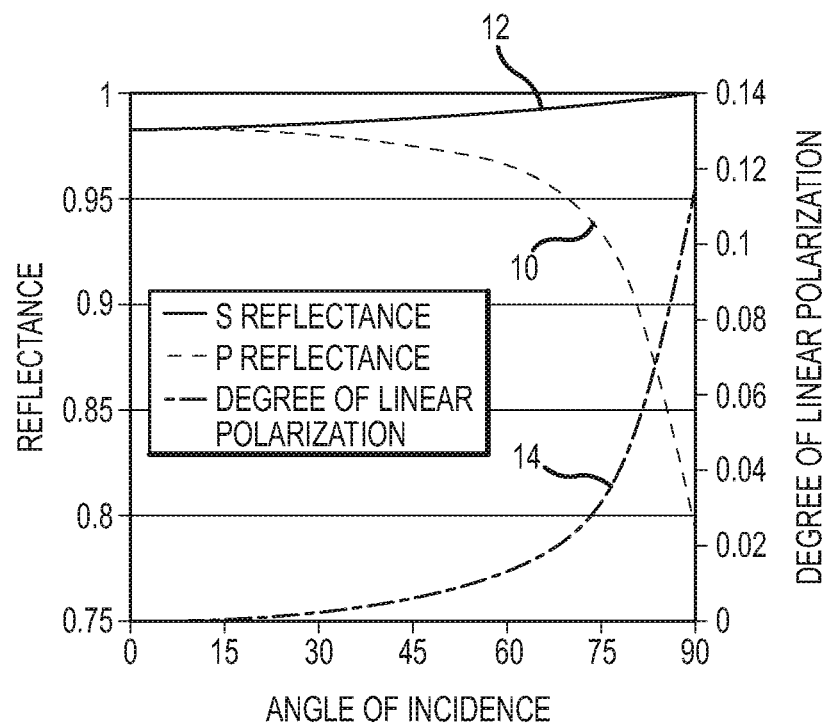
FIG. 1, as described above, is a plot of reflected specular radiance vs. angle of incidence.
Figure 2B:
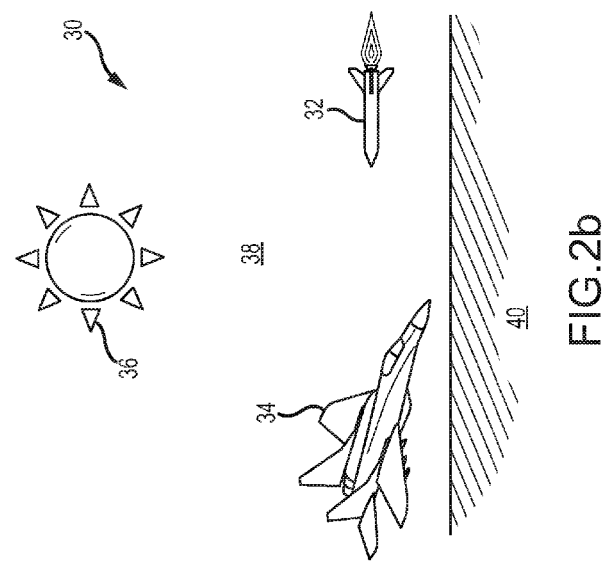
FIGS. 2a and 2b are diagrams of different 3-D polarimetric imaging applications exhibiting structured scene reflections.
Figure 2A:
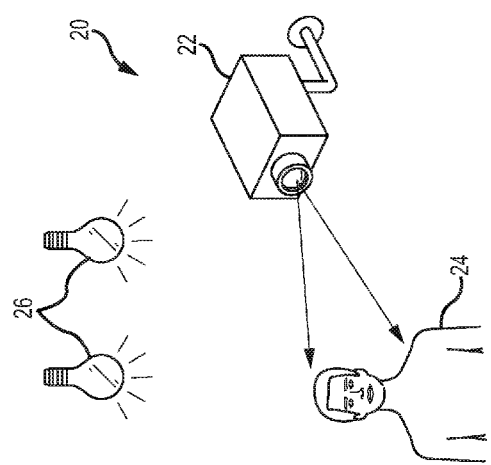

Referring now to FIGS. 2a and 2b, structured scene reflections are common to many environments and applications in which 3-D polarimetric imaging is applicable. As shown in FIG. 2a, a scene 20, which might be found in airport, train station, bus station, theater, sporting venue, court house, school etc., has a 3-D polarimetric imaging system 22 at a fixed location and orientation to view patrons 24 as they pass through a specified area (e.g., doors, x-ray scanners etc.). The polarimetric imaging system 24 creates 3-D images in one or more spectral bands (Visible or IR) of, for example, the patron's face. Multi-band processing may further improve the 3-D image in a number of ways, by, for instance, calculating the surface normal in each band and using them (either by residual sum of squares or other statistical estimation technique) to reduce the uncertainty in the final estimate of the normal. These 3-D images may be used, for example, in conjunction with facial recognition to identify the patron. These types of scenes will, for example, have overhead lighting 26 that creates structured scene reflections that, if uncompensated, will corrupt the surface normal calibration maps and ultimate the 3-D image of the object.

As shown in FIG. 2b, a scene 30 representative of an engagement of a guided missile 32 with a target aircraft 34 also exhibits structured scene reflections due to the sun 36 and the delineation between sky 38 and ground 40. In this example, guided missile 32 is provided with a polarimetric imaging system to extract shape information and to reconstruct 3-D images of the target aircraft 34 for identification, tracking and aimpoint selection.

Figure 3:
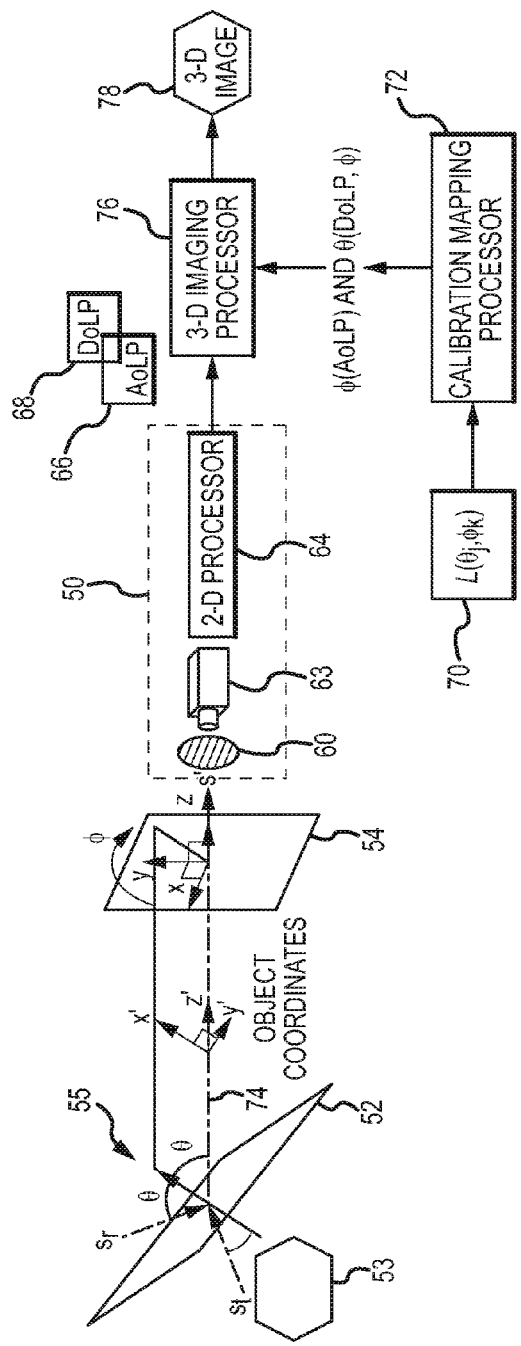
FIG. 3 is a diagram of a 3-D polarimetric imaging system and the surface normal geometry of the object.
Figure 4:
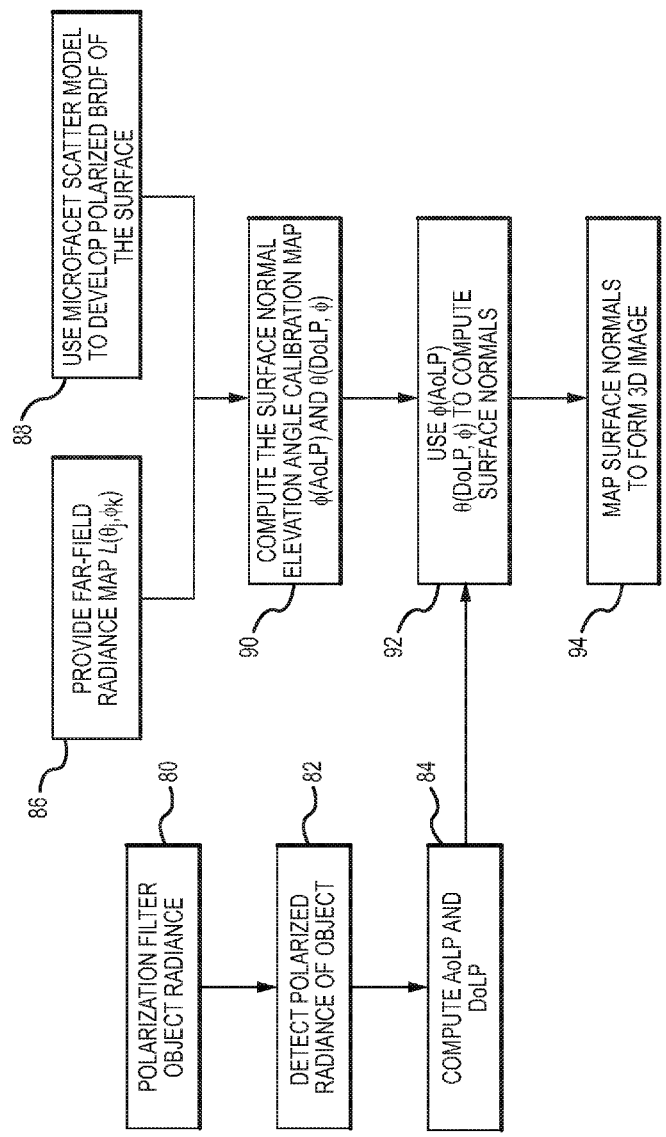
FIG. 4 is a flow diagram of an embodiment of 3-D polarimetric imaging using a multifacet scattering model to compute the surface normal calibration maps.

Referring now to FIGS. 3-4, an embodiment of a 3-D polarimetric imaging system includes a linear Stokes polarimeter 50 oriented with a line-of-sight to a surface 52 of an object 53. Object coordinates are given in x,y,z where x,y define a pixel location in an object plane 54 and z is the depth at each pixel. A surface normal 55 at the object surface 52 is defined by azimuth angle $\phi$ and elevation angle $\theta$.

Linear Stokes polarimeter 50 includes a polarizer 60 that amplitude modulates incident light as a function of polarization (step 80), a sensor 62 such as a focal plane array for a given spectral band or bands (e.g., VIS-SWIR or MWIR-LWIR) that detects polarized radiance (via the amplitude modulation) (step 82) and a 2-D imaging processor 64 to process the polarization filtered light to generate AoLP and DoLP images 66 and 68, of the surface of the object (step 84).

Polarimetry requires at least three measurements to analyze the polarization components of light; at least two different polarization components and possibly an unpolarized component, and generate the S0, S1 and S2 components of the Stokes vector where S0 is usually the total flux (e.g. Watts) in the beam of light, S1 is the difference in the flux of the beam transmitted through a linear analyzer whose transmission axis is oriented at $\phi=0°$ and the flux transmitted through a analyzer at $\phi=90°$, and S2 is the difference in flux transmitted through a linear analyzer whose transmission axis is oriented at $\phi=45°$ and the flux transmitted through a polarizer at $\phi=135°$. The S3 component is the difference in the flux of the beam transmitted through a right-circular analyzer and the flux transmitted through a left-circular analyzer, but is not measured in a linear Stokes polarimeter.

Polarizer 62 may, for example, be a rotating linear polarizer or a pixelated filter array. The former time-multiplexes measurements at different polarization states whereas the later spatially multiplexes measurements at different polarization states. The pixelated filter sub-arrays may have linear polarization values optimized for perfect alignment with the sensor or for a probabilistic misalignment. Typically, the pixelated filter array, and the FPA, are divided into groups of four pixels (e.g., a 2×2 sub-array of pixels). The standard commercially available pixelated filter array is a 2×2 array of linear polarizers having angular values of $\Theta_1=0°$, $\Theta_2=45°$, $\Theta_3=90°$ and $\Theta_4=135°$, respectively, which are optimum assuming perfect alignment between the pixelated filter array and the FPA. U.S. Patent Publication 2014/0063299 to Fest et. al. entitled "Movable Pixelated Filter Array" describes a technique for using the data reduction matrix to account for misalignment. Alternately, the size of the sub-array and the angular values may be optimized to account for misalignment as described in co-pending patent application Ser. No. 14/836,305 entitled "Polarized Pixelated Filter Array with Reduced Sensitivity to Misalignment for Polarimetric Imaging" filed Aug. 26, 2015, which is hereby incorporated by reference.

A far-field radiance map $L(\theta,\phi)$ 70 provides a map of the external reflective sources in the scene in a spectral band(s) from the perspective of the object where $\theta$ and $\phi$ are the elevation angle and azimuth angle components of a surface normal of the object. The map suitably provides the angular locations, brightness and angular extent of each source in a hemisphere looking from the object towards the sensor 64. The map may be thresholded to eliminate sources of noise. The far-field radiance map may be known, modeled or measured (step 86). For example, the geometry and characteristics of external lighting sources may be known for certain fixed scenes. For scene such as for the guided missile and aircraft, the precise scene may not be known or measurable a priori but the effects of sky and ground can be accurately modeled. Alternately, a camera can be placed at the location and orientation of the object and used to take a picture of the hemisphere in which the external sources reside. Equivalently a reflective sphere can be placed at the object location and a camera at the location and orientation of the linear Stokes polarimeter can be used to take the picture.

A calibration mapping processor 72 is configured to compute a polarized bidirectional distribution function (BRDF) of a surface of the object using a microfacet scattering model (step 88) and to compute surface normal calibration maps $\phi(AoLP)$ and $\theta(DoLP, \phi)$ (step 90) based on the far-field radiance map $L(\theta, \phi)$, the polarized BRDF and a line-of-sight vector 74 from the linear Stokes polarimeter to the object.

A 3-D imaging processor 76 is configured to apply the surface normal calibration maps $\phi(AoLP)$ and $\theta(DoLP, \phi)$ to the AoLP and DoLP images to compute an array of surface normal (step 92) for the object and to map the array of surface normals to form a 3-D image 78 of the object (step 94). The mapping algorithm is suitably performed using a shape shading algorithm such as the Frankot-Chellapa algorithm.

Our approach is based on the well-known Stokes-Mueller calculus S=M*Sin where M is the 4×4 Mueller matrix that characterizes the optical properties of the object surface, Sin is the Stokes vector of the incident radiation to describe the polarization state of the structured scene reflections from external light sources and S is the Stokes vector the describes the polarization state of radiation emitted by or reflected from the object surface. Stokes-Mueller calculus was first published by Stokes in 1852. The modern, definitive reference on Stokes-Mueller calculus is D. Goldstein, Polarized Light, $3^{rd}$, Ed., CRC press (2010), which is hereby incorporated by reference.

Figure 5:
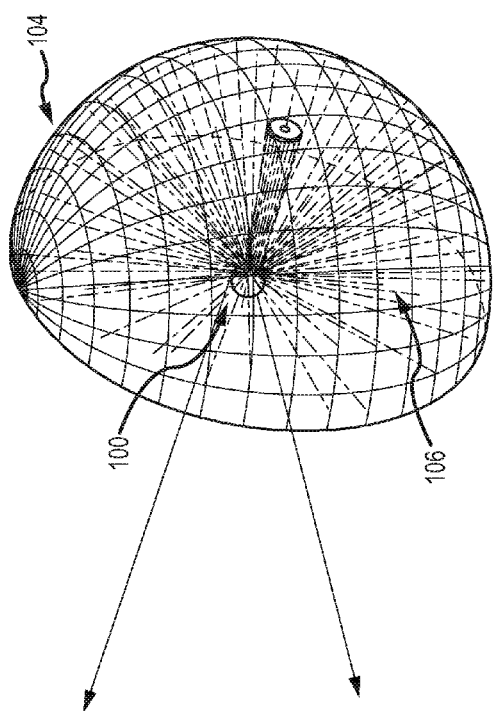
FIG. 5 is a diagram illustrating the ray tracing of the radiance map to the surface of the object using the multifacet scattering model.
Figure 5:
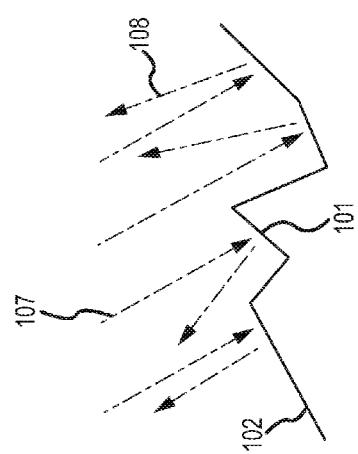

Referring now to FIG. 5, in our approach for constructing the surface normal calibration maps for an object 100 with surface microfacets 101 in which incident light 107 is scattered off of the microfacets 101 into scattered light 108 and generating a 3-D image of the object, $$\vec{S}(\theta_i, \phi_i) = \vec{M}_\varepsilon(\theta_i, \phi_i, 0, 0)[L_\varepsilon \; 0 \; 0]^T + \sum_{j=0}^{n_j} \sum_{k=0}^{n_k} \vec{M}_R(\theta_i, \phi_i, \theta_j, \phi_k)[L(\theta_j, \phi_k) \; 0 \; 0]^T \Omega_{j,k}$$

where S is the object radiance Stokes vector [ph/s-cm$^2$-sr], M$\varepsilon$ is the Mueller matrix of object emissivity [1/sr], L is the object emitted blackbody radiance [ph/s-cm$^2$-sr], $M_R$ is the Mueller matrix of the polarized BRDF [1/sr] of object surface 102, $L(\theta_j,\phi_k)$ is the sample scene radiance map 104, $\Omega_{j,k}$=projected solid angle of the (j,k)th element of L(q$_j$,f$_k$), $0 \leq j \leq n_j$, $0 \leq k \leq n_k$ where $n_j$ is the number of elevation points $\theta_j$ in the radiance map, $n_k$ is the number of azimuth points $\phi_k$ and $0 \leq \theta_j \leq \pi$, $0 \leq \phi_k \leq \pi$. In the visible to SWIR band the emission term is typically ignored.

The input Stokes vector Sin for an unpolarized ray 106 from the sampled radiance map 104 to the object surface 102 is given by radiance map $L(\theta_j,\phi_k)$ 70 and solid angle $\Omega_{j,k}$. Assuming unpolarized external sources, S0=radiance value of the map element*$\Omega_{j,k}$, and S1=S2=S3.

The Mueller matrix for a given object surface is computed using a microfacet scattering model to develop a functional form of the polarized BRDF of the object surface. Microfacet (MF) scattering models can be used to accurately predict how much light a target surface will scatter when illuminated (i.e. how bright it appears to be, which is quantified by its Bidirectional Reflectance Distribution Function or BRDF). These models assume that the surface is comprised of many small facets at different orientations, with the average diameter of each facet being much larger than the wavelength of incident light but much smaller than the diameter of the surface being modeled. Different MF scattering models are described by (1) J. Shell, "Polarimetric Remote Sensing in the Visible to Near Infrared", Ph. D. Dissertation, Rochester Institute of Technology (2005), (2) R. Priest and S. Meier, "Polarimetric microfacet scattering theory with applications to absorptive and reflective scattering surfaces", Optical Engineering 41 (5), pp. 988-993 (2002) and (3) T. Germer, "Polarized light diffusely scattered under smooth and rough interfaces", Proc. SPIE 5158, pp. 193-204 (2003).

Accurate MF scattering models (such as the Shell model) are functions of both the Angle of Incidence (AOI, as measured from the normal to the surface) of the beam used to illuminate the surface and of the scatter angle the scattered beam makes with the surface on its way to the observer. In addition, the Shell model can be used to predict the polarization state of the scattered beam. They are also often a function of the substrate material (usually its complex refractive index) and of the surface roughness, which is quantified using one or more roughness parameters.

MF models (including the Shell model) often compute the BRDF as the product of three terms:

1. A first term that quantifies the amount of light reflected as a function of the material (described in Shell dissertation section 8.1.3.),
2. A second term that quantifies the amount of light reflected as a function of the surface roughness (section 8.11), and
3. A third term that quantifies the amount of light reflected due to diffuse scatter mechanisms, such as scatter from imperfections or inclusions inside the material (this is sometimes called bulk scatter) (section 8.15).

The first term is the Mueller matrix that describes the output polarization state given the input polarization state. The second and third terms are mainly scale factors to the Mueller matrix.

The MF models also include a number of coordinate transformations and normalization terms. Term 1 (above) is usually computed using the Fresnel equations, which take as input the complex refractive index of the surface and the AOI of the illumination beam, and output the fraction of light reflected (and, in the case of the Shell model, the polarization state of the reflected light). For MF models, the AOI is measured from the surface normal of the facet. Term 2 is computed using a statistical function that describes how much variation there is in the surface normal of the facets (i.e. how rough it is), and is also a function of the scatter angle and AOI. This term will be very high in the case of a very smooth surface at a scatter angle equal to the AOI (i.e. a "glint" or specular reflection), very low for a very rough surface, etc. Term 3 quantifies how much scattering occurs inside the material; this term will be very high for a piece of glass with many bubbles in it, but very low for a piece of glass with no bubbles. The product of these terms is the predicted BRDF, hence Mueller matrix.

The output Stokes vector S is the matrix vector product of the Mueller matrix $M_R$ and the input Stokes vector Sin. The output Stokes vector $S(\theta_i,\phi_i)$ is indexed over all possible orientations of the surface normal relative to the line of sight such that all of the "i" elements make up the final calibration map. For a given orientation of the surface normal relative to the LOS (given by index "i"), which defines the scatter angle for the Mueller matrix calculation, the matrix-vector product is a double summation over all elements (indexed by j,k) of the hemispherical far-field radiance map. The (j,k) index defines the angle of incidence of the Mueller matrix. A Stokes vector is traced from each element of the hemispherical map and multiplied by the Mueller matrix to get the Stokes. This is repeated for the next (j, k) element and its resulting Stokes vector is added to the previous one.

The AoLP and DoLP values are computed as:

$$\text{AoLP}(\phi_i)=0.5*\text{atan}(S2(\theta_i,\phi_i)/(S1(\theta_i,\phi_i)) \text{ and}$$

$$\text{DoLP}(\theta_i,\phi_i)=\text{sqrt}(S1(\theta_i,\phi_i)^2+S2(\theta_i,\phi_i)^2)/S0.$$

Figure 6:
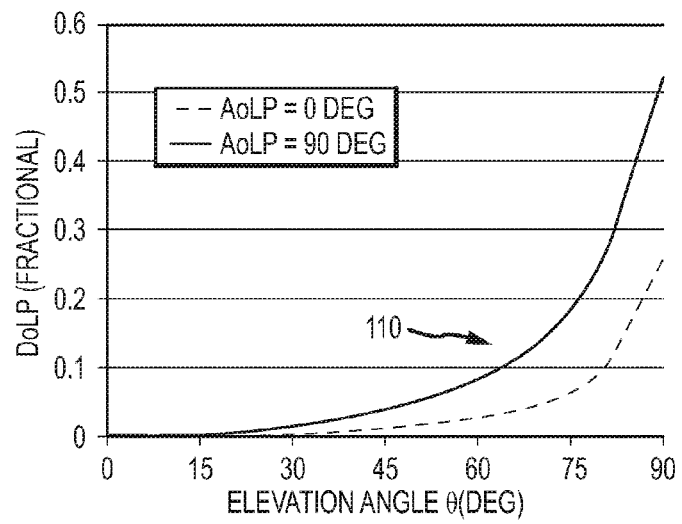
FIG. 6 is a plot of a family of DoLP vs elevation angle calibration maps for different azimuth angles.

AoLP($\phi$) and DoLP($\theta,\phi$) are inverted, typically by fit the map to a function, to compute $\phi$(AoLP) and $\theta$(DoLP,$\theta$), which may be combined into a single calibration map $\theta$(DoLP, AoLP) 110 as shown in FIG. 6. $\theta$(DoLP, AoLP)=DoLP$^{-1}$($\theta$, AoLP+90° for reflective bands and $\theta$(DoLP, AoLP)=DoLP$^{-1}$($\theta$, AoLP) for emissive bands. Typically map 110 would have an entire family of curves for different AoLP values.

Figure 7:
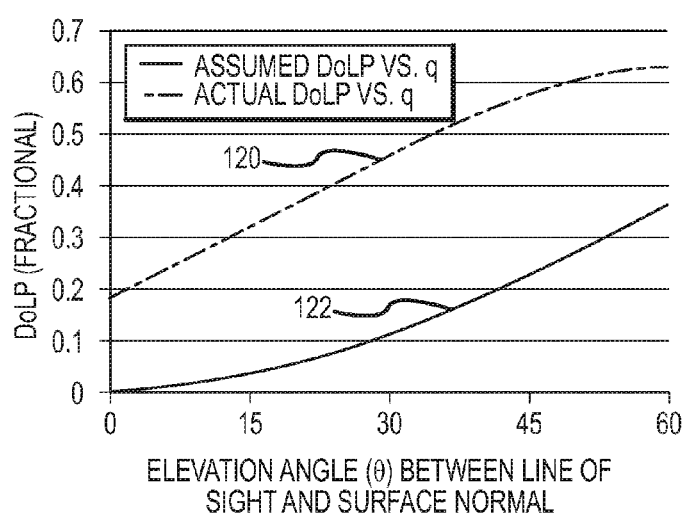
FIG. 7 is a plot of DoLP vs elevation angle calibration map with and with compensation for structured scene reflections.

FIG. 7 illustrates a calibration map 120 with no correction for structured scene reflections and a calibration map 122 using the microfacet scattering model approach to correct for structured scene reflections. As shown, there is a significant difference in the corrected map 122, which closely approximately the actual DoLP vs. elevation angle for a given azimuth angle, and the uncorrected calibration map 120. This difference is reflected in the quality of the 3-D image of the object.

Figure 8:
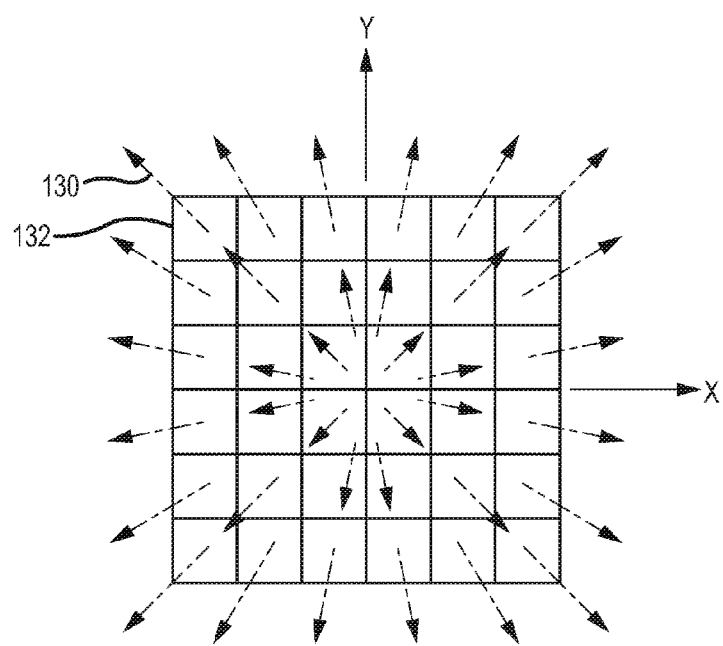
FIG. 8 is a diagram illustrating the surface normal at each pixel of a spherical object.
Figure 9:
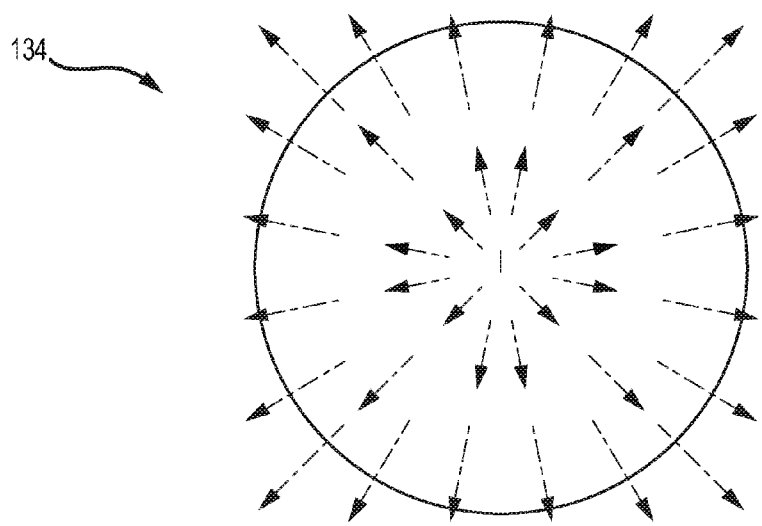
FIG. 9 is a diagram illustrating the 3-D image of the spherical object.

Referring now to FIGS. 8 and 9, the calibration map θ(DoLP, AoLP) and the AoLP and DoLP images of the object are used to compute the elevation and azimuth angles of the surface normal 130 at points on the object corresponding to pixels $(\theta_{i,j}, \phi_{i,j})$ 132. The data products$(\theta_{i,j}, \phi_{i,j})$ as well as lateral locations of each pixel at the object $(x_{ij}, y_{ij})$ (which can be computed from the IFOV and the focal length) are input into the Frankot-Chellappa (or similar) algorithm to compute the depth at each pixel $z_{ij}$, which define a 3-D image 134 of the object.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of computing calibration maps for 3-D polarimetric imaging of an object by a sensor to compensate for structured scene reflections, comprising:
   providing a far-field radiance map L(θ,φ) in a spectral band of a scene from the perspective of the object where θ and φ are the elevation angle and azimuth angle components of a surface normal of the object;
   using a microfacet scattering model to compute a polarized bidirectional distribution function (BRDF) of a surface of the object; and
   using the far-field radiance map $L(\theta_j, \phi_k)$, polarized BRDF and a line-of-sight vector from the sensor to the object to compute surface normal calibration maps φ(AoLP) and θ(DoLP,φ) where AoLP and DoLP are the values of the Angle of Linear Polarization and Degree of Linear Polarization images at a given pixel.

2. The method of claim 1, wherein the step of computing the surface normal calibration maps comprises:
   for each of a plurality of $\theta_i$ and $\phi_i$ that span a specified volume of the scene, for all points in the radiance map L(θ,φ),
   tracing an unpolarized ray, represented by a Stokes vector Sin of the unpolarized ray, to the surface of the object;
   using the polarized BRDF to compute a Mueller matrix $M_R$ of the object surface for the unpolarized ray;
   multiplying the Stokes vector Sin by the Mueller Matrix $M_R$ to compute a Stokes vector S having components S0, S1 and S2 to the sensor;
   adding all of the Stokes vectors S for all points in the radiance map for each elevation and azimuth angle pair; and
   computing an AoLP(φ)=0.5*atan(S2/S1) and DoLP(θ, φ)=sqrt($S1^2+S2^2$)/S0 and
   inverting AoLP(φ) and DoLP(θ,φ) to compute φ(AoLP) and θ(DoLP,φ).

3. The method of claim 2, wherein the steps of computing the Stokes vector S for a reflective band comprises:

$$\vec{S}(\theta_i, \phi_i) = \sum_{j=0}^{n_j} \sum_{k=0}^{n_k} \vec{M}_R(\theta_i, \phi_i, \theta_j, \phi_k)[L(\theta_j, \phi_k) \ 0 \ 0]^T \Omega_{j,k}$$

where $\Omega_{j,k}$=projected solid angle of the (j,k)th element of $L(q_j, f_k)$.

4. The method of claim 3, wherein the spectral band spans a portion of the visible to SWIR bands.

5. The method of claim 1, wherein the steps of computing the Stokes vector S for an emissive band comprises:

$$\vec{S}(\theta_i, \phi_i) = \vec{M}_\varepsilon(\theta_i, \phi_i, 0, 0)[L_\varepsilon \ 0 \ 0]^T +$$
$$\sum_{j=0}^{n_j} \sum_{k=0}^{n_k} \vec{M}_R(\theta_i, \phi_i, \theta_j, \phi_k)[L(\theta_j, \phi_k) \ 0 \ 0]^T \Omega_{j,k}$$

where $\Omega_{j,k}$=projected solid angle of the (j,k)th element of $L(q_j, f_k)$ and $M_e$ is the Mueller matrix of the object emissivity.

6. The method of claim 5, wherein the spectral band spans a portion of the MWIR to LWIR bands.

7. The method of claim 1, wherein the far-field radiance map L(θ,φ) includes a plurality of structured reflective sources in the spectral band.

8. The method of claim 1, further comprising combining the surface normal calibration maps φ(AoLP) and θ(DoLP,φ) into a surface normal calibration map θ(DoLP,AoLP).

9. The method of claim 1, wherein the sensor is a linear Stokes polarimeter further comprising:
   sensing radiance from the object in the spectral band using the linear Stokes polarimeter, which outputs AoLP and DoLP images of the object;
   applying the surface normal calibration maps φ(AoLP) and θ(DoLP,φ) to the AoLP and DoLP images to compute an array of surface normals for the object; and
   mapping the array of surface normals to form a 3-D image of the object.

10. The method of claim 1, wherein the linear Stokes polarimeter comprises:
    a pixelated focal plane array (FPA);
    a microgrid polarizer array having a plurality of polarized pixelated filter sub-arrays positioned at the FPA or an intermediate image of the focal plane, each sub-array comprising three or more filter pixels Q of which at least two filter pixels impart a linear polarization of a certain and different angular value; and
    a processor configured to read out and process multiple groupings of three or more FPA pixels L<=Q to compute the AoLP and DoLP images.

11. The method of claim 10, wherein each grouping of L filter pixels includes at least two filter pixels that impart a linear polarization of a certain angular value, each said grouping having a different composition of said angular values, wherein said angular values are set to minimize sensitivity of a condition number (CN) of the filter sub-array's data reduction matrix to misalignment for a non-zero probability of misalignment of the filter sub-array to the FPA.

12. The method of claim 1, wherein surface normal calibration maps φ(AoLP) and θ(DoLP,φ) are calculated for a first spectral band in the visible to SWIR bands and a second spectral band in the MWIR to LWIR bands.

13. A method of 3-D polarimetric imaging of an object by a linear Stokes polarimeter to compensate for structured scene reflections, comprising:
    providing a far-field radiance map L(θ,φ) in a spectral band of a scene from the perspective of the object where θ and φ are the elevation angle and azimuth angle components of a surface normal of the object;

using a microfacet scattering model to compute a polarized bidirectional distribution function (BRDF) of a surface of the object; and using the far-field radiance map $L(\theta_j,\phi_k)$, polarized BRDF and a line-of-sight vector from the linear Stokes polarimeter to the object to compute surface normal calibration maps $\phi(AoLP)$ and $\theta(DoLP,\phi)$ where AoLP and DoLP are the values of the Angle of Linear Polarization and Degree of Linear Polarization images at a given pixel;

using the linear Stokes polarimeter to sense radiance from the object in the spectral band, said linear Stokes polarimeter outputting AoLP and DoLP images of the object;

applying the surface normal calibration maps $\phi(AoLP)$ and $\theta(DoLP,\phi)$ to the AoLP and DoLP images to compute an array of surface normals for the object; and mapping the array of surface normals to form a 3-D image of the object.

14. The method of claim 13, wherein the step of computing the surface normal calibration maps comprises:

for each of a plurality of $\theta_i$ and $\phi_i$ that span a specified volume of the scene, for all points in the radiance map $L(\theta,\phi)$, tracing an unpolarized ray, represented by a Stokes vector Sin of the unpolarized ray, to the surface of the object;

using the polarized BRDF to compute a Mueller matrix $M_R$ of the object surface for the unpolarized ray;

multiplying the Stokes vector Sin by the Mueller Matrix $M_R$ to compute a Stokes vector S having components S0, S1 and S2 to the sensor;

adding all of the Stokes vectors S for all points in the radiance map for each elevation and azimuth angle pair; and computing an $AoLP(\phi)=0.5*atan(S2/S1)$ and $DoLP(\theta,\phi)=sqrt(S1^2+S2^2)/S0$; and inverting $AoLP(\phi)$ and $DoLP(\theta,\phi)$ to compute $\phi(AoLP)$ and $\theta(DoLP,\phi)$.

15. A 3-D polarimetric imaging system, comprising:

a linear Stokes polarimeter configured to sense radiance in a spectral band from an object in a scene that includes a plurality of structured reflective sources in the spectral band, said linear Stokes polarimeter configured to output angle of linear polarization (AoLP) and degree of linear polarization (DoLP) images of the object;

a far-field radiance map $L(\theta,\phi)$ in the spectral band of the scene from the perspective of the object where $\theta$ and $\phi$ are the elevation angle and azimuth angle components of a surface normal of the object;

a calibration mapping processor to compute a polarized bidirectional distribution function (BRDF) of a surface of the object using a microfacet scattering model and to compute surface normal calibration maps $\phi(AoLP)$ and $\theta(DoLP,\phi)$ based on the far-field radiance map $L(\theta,\phi)$, polarized BRDF and a line-of-sight vector from the linear Stokes polarimeter to the object; and a 3-D imaging processor configured to apply the surface normal calibration maps $\phi(AoLP)$ and $\theta(DoLP,\phi)$ to the AoLP and DoLP images to compute an array of surface normals for the object and to map the array of surface normals to form a 3-D image of the object.

16. The 3-D polarimetric imaging system of claim 15, wherein the linear Stokes polarimeter comprises:

a pixelated focal plane array (FPA);

a microgrid polarizer array having a plurality of polarized pixelated filter sub-arrays positioned at the FPA or an intermediate image of the focal plane, each sub-array comprising three or more filter pixels Q of which at least two filter pixels impart a linear polarization of a certain and different angular value; and a processor configured to read out and process multiple groupings of three or more FPA pixels L<=Q to compute the AoLP and DoLP images.

17. The 3-D polarimetric imaging system of claim 16, wherein each grouping of L filter pixels includes at least two filter pixels that impart a linear polarization of a certain angular value, each said grouping having a different composition of said angular values, wherein said angular values are set to minimize sensitivity of a condition number (CN) of the filter sub-array's data reduction matrix to misalignment for a non-zero probability of misalignment of the filter sub-array to the FPA.

18. The 3-D polarimetric imaging system of claim 15, wherein the calibration mapping processor is configured to compute the surface normal calibration maps by:

for each of a plurality of $\theta_i$ and $\phi_i$ that span a specified volume of the scene, for all points in the radiance map $L(\theta,\phi)$, tracing an unpolarized ray, represented by a Stokes vector Sin of the unpolarized ray, to the surface of the object;

using the polarized BRDF to compute a Mueller matrix $M_R$ of the object surface for the unpolarized ray;

multiplying the Stokes vector Sin by the Mueller Matrix $M_R$ to compute a Stokes vector S having components S0, S1 and S2 to the sensor;

adding all of the Stokes vectors S for all points in the radiance map for each elevation and azimuth angle pair; and computing an $AoLP(\phi)=0.5*atan(S2/S1)$ and $DoLP(\theta,\phi)=sqrt(S1^2+S2^2)/S0$; and inverting $AoLP(\phi)$ and $DoLP(\theta,\phi)$ to compute $\phi(AoLP)$ and $\theta(DoLP,\phi)$.

* * * * *